United States Patent

Tabata et al.

[11] Patent Number: 5,831,712
[45] Date of Patent: Nov. 3, 1998

[54] OPTICAL APPARATUS HAVING OCULAR OPTICAL SYSTEM

[75] Inventors: Seiichiro Tabata, Hino; Yuji Ogasawara, Hachioji, both of Japan

[73] Assignee: Olympus Optical Co., Ltd., Tokyo, Japan

[21] Appl. No.: 903,921

[22] Filed: Jul. 31, 1997

Related U.S. Application Data

[63] Continuation of Ser. No. 551,399, Nov. 1, 1995, abandoned.

[30] Foreign Application Priority Data

Nov. 2, 1994 [JP] Japan .................... 6-269770

[51] Int. Cl.$^6$ .................................................. G02C 1/00
[52] U.S. Cl. .......................................................... 351/158
[58] Field of Search ........................ 351/158, 41; 359/40, 359/83, 63, 630, 631, 633, 473; 345/8; 349/8, 9

[56] References Cited

U.S. PATENT DOCUMENTS 5,467,205  11/1995  Kuba et al. .................................. 359/40
5,526,184  6/1996  Tokuhashi et al. ...................... 359/630

FOREIGN PATENT DOCUMENTS 1-097378  6/1989  Japan .
5-100192  4/1993  Japan .
6-118337  4/1994  Japan .

*Primary Examiner*—Hung X. Dang
*Attorney, Agent, or Firm*—Cushman Darby & Cushman IP Group of Pillsbury Madison & Sutro LLP

[57] ABSTRACT

An optical apparatus, e.g. a head-mounted display apparatus, which enables observation of a favorable image by eliminating flare and ghost images caused by unwanted light coming in through the gap between an observer's eyeball and an optical unit of the apparatus. Display light of an electronic image emanating from a liquid crystal display device and outside world light coming in through a liquid crystal shutter (7) are p-polarized light and therefore pass through a polarizing plate (8) and reach an observer's eyeball (1) without any loss. Meanwhile, light that undesirably comes in through the gap between the observer's face and the optical unit is generally natural light and hence unpolarized. Therefore, when the unwanted light passes through the polarizing plate (8) after being reflected from the eyeball (1) or a mirror (3), the light intensity reduces to ½. Although the light is successively reflected by the concave mirror (3) and the half-mirror (2) to reach the eyeball (1), the intensity ratio of the ghost image to the normal electronic image becomes ½. Thus, an electronic image of improved contrast can be observed.

12 Claims, 7 Drawing Sheets

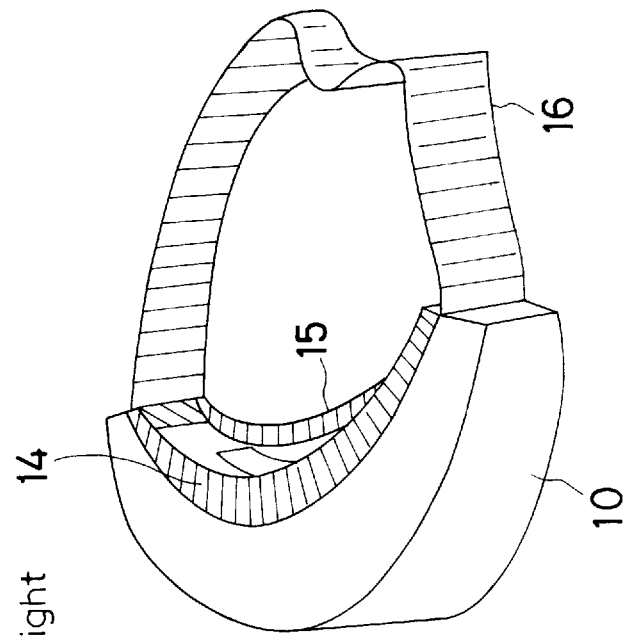
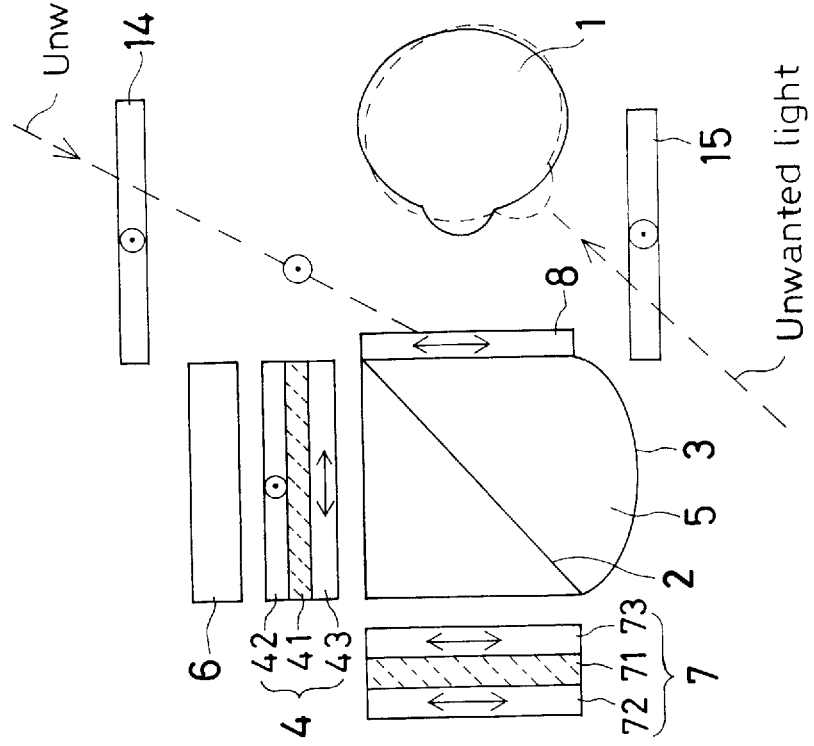

OPTICAL APPARATUS HAVING OCULAR OPTICAL SYSTEM

This is a continuation of application Ser. No. 08/551,399, filed on Nov. 1, 1995 now abandoned, which was abandoned upon the filing hereof.

BACKGROUND OF THE INVENTION

The present invention relates to an optical apparatus having an ocular optical system. More particularly, the present invention relates to an optical apparatus which is designed to be mounted on an observer's head or face and to lead an image to an eyeball of the observer by an ocular optical system as in a head-mounted display apparatus.

For a head-mounted display apparatus having a two-dimensional display device for displaying a polarized light image, such as a liquid crystal display device, and a mirror, optical arrangements such as those shown in FIGS. 10(a), 10(b) and 10(c) have heretofore been proposed (for example, see Japanese Patent Application Unexamined Publication (KOKAI) No. 6-118337). FIG. 10(a) shows an arrangement in which a concave mirror 3 is disposed in the visual axis direction, and a half-mirror 2 is disposed at a side of the concave mirror 3 which is closer to an eyeball 1 in such a manner as to extend obliquely to the optical axis, thereby reflecting light from a liquid crystal display device 4 disposed off the visual axis to the concave mirror 3. FIG. 10(b) shows an arrangement in which a liquid crystal display device 4 and a concave mirror 3 are disposed to face each other across the visual axis, and a half-mirror 2 is disposed between the concave mirror 3 and the liquid crystal display device 4 so as to extend obliquely to the optical axis, thereby allowing an electronic image reflected from the concave mirror 3 to be reflected to an eyeball 1 by the half-mirror 2. FIG. 10(c) shows an arrangement in which light from a liquid crystal display device 4 disposed off the visual axis is reflected to an eyeball 1 by a decentered concave mirror 3. The arrangements shown in FIGS. 10(a) and 10(c) may be modified such that the concave mirror 3 is arranged in the form of a half-mirror, and a shutter such as a liquid crystal shutter is provided forwardly of the half-mirror as viewed in the visual axis direction, thereby enabling an outside world image to be selectively viewed or superimposed on an electronic image of the liquid crystal display device 4 by opening or closing the shutter. It should be noted that the dashed line in each figure indicates the travel direction of outside world light. In the arrangements shown in FIGS. 10(a) and 10(b), the half-mirror 2 may be provided in a prism.

In such a head-mounted display apparatus, a display apparatus body (optical unit) 10 (see FIG. 11) which integrally contains an ocular optical system and a liquid crystal display device such as those shown in FIGS. 10(a) to 10(c), together with an electric circuit for driving the liquid crystal display device, is supported on an observer's head by a headband or other supporting member so that the optical unit 10 is disposed in front of an observer's eyeball 1. If a gap is provided between the optical unit 10 and the eyeball 1, as shown in the schematic sectional view of FIG. 11, the observer can advantageously see a keyboard or other object in the outside world by turning his/her eyeball 1 upwardly or downwardly (see Japanese Patent Application Unexamined Publication (KOKAI) No. 5-100192).

However, as shown in FIG. 12, light that undesirably comes in through the gap between the optical unit 10 and the eyeball 1 may directly enter the inside of a prism 5 in which a half-mirror 2 is provided (light ①), or it may be reflected by the eyeball 1 and further reflected by the half-mirror 2 to enter the eyeball 1 (light ②). The former light ① is recognized as flare; the latter light ② is recognized as an image (ghost image) of the observer's eyeball 1. In either case, the unwanted light obstructs observation of the normal electronic image. It should be noted that in FIG. 12, the optical arrangement shown in FIG. 10(b) is used as an example.

Japanese Utility Model Application Unexamined Publication (KOKAI) No. 1-97378 proposes a method for eliminating ghost images. With this method, however, light from a display device reaches an observer's eyeball after the quantity of light has reduced to ½. The same can be said of a system which uses a polarizing display device, e.g. an LCD (Liquid Crystal Display). That is, light passing through a quarter-wave plate is converted into circularly polarized light, and the polarized light enters a polarizing plate. At that time, a half of the light quantity is absorbed by the polarizing plate.

SUMMARY OF THE INVENTION

In view of the above-described problems of the conventional techniques, an object of the present invention is to provide an optical apparatus having an ocular optical system, e.g. a head-mounted display apparatus, which enables observation of a favorable image by eliminating flare and ghost images caused by unwanted light coming in through the gap between an observer's eyeball and an optical unit of the apparatus without reducing the quantity of light from a display device.

To attain the above-described object, the present invention provides an optical apparatus including an ocular optical system for leading a polarized light image to an observer's eyeball, and a reflecting mirror for reflecting the image, in which a polarizing plate is disposed between the reflecting mirror and the observer's eyeball.

In addition, the present invention provides an optical apparatus including an ocular optical system for leading an image to an observer's eyeball, and a reflecting mirror for reflecting the image. The ocular optical system and the reflecting mirror are contained in an optical unit. The optical apparatus further includes a visor formed from a polarizing plate disposed on the observer's side of the optical unit, and a polarizing plate which is disposed between the reflecting mirror and the observer's eyeball, and which has a polarized light transmitting direction perpendicularly intersecting the polarized light transmitting direction of the visor.

In addition, the present invention provides an optical apparatus including an ocular optical system for leading an image to an observer's eyeball, and a reflecting mirror for reflecting the image. The optical apparatus further includes a polarizing plate which is disposed between the reflecting mirror and the observer's eyeball, and a quarter-wave plate which is disposed between the reflecting mirror and the polarizing plate so that the crystallographic axis direction of the quarter-wave plate is at 45 degrees to the polarized light transmitting direction of the polarizing plate.

The above-described optical apparatuses may be provided with a device for supporting a display device for displaying an image, the ocular optical system and the reflecting mirror on the observer's head.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 5(a) is a sectional view showing the optical arrangement of a head-mounted display apparatus according to a fifth embodiment of the present invention.

FIG. 5(b) is a perspective view of the head-mounted display apparatus according to the fifth embodiment, which is arranged in the form of a goggle type head-mounted display apparatus.

DESCRIPTION OF THE PREFERRED EMBODIMENTS

Some embodiments of a head-mounted display apparatus according to the present invention will be described below with reference to the accompanying drawings.

[First embodiment]

In this embodiment, a polarizing plate is disposed between an observer's eyeball and an optical system, thereby eliminating flare and ghost images caused by light that undesirably comes in through the gap between the eyeball and the optical unit of the apparatus. As shown in the sectional view of FIG. 1, the arrangement shown in FIG. 10(b) is, for example, used as an optical arrangement of the head-mounted display apparatus in this embodiment. It should be noted that the following description similarly applies in the case of the other arrangements, which are shown in FIGS. 10(a) and 10(c).

Figure 1:
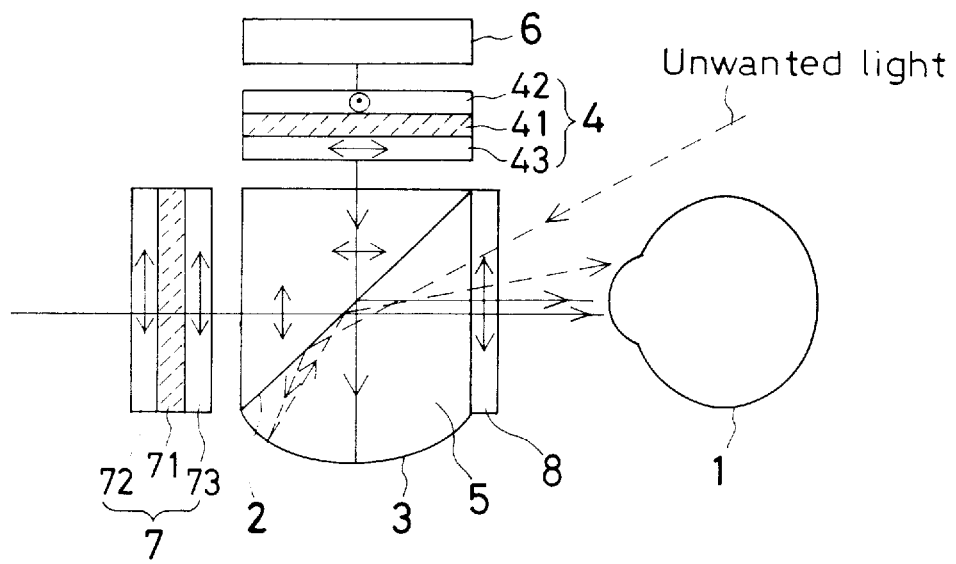
FIG. 1 is a sectional view showing the optical arrangement of a head-mounted display apparatus according to a first embodiment of the present invention.

Referring to FIG. 1, a liquid crystal display device (LCD) 4 is illuminated by a back light 6. A concave mirror 3 is provided in a prism 5. The LCD 4 and the concave mirror 3 are disposed to face each other across the visual axis of an observer's eyeball 1. A half-mirror 2 is provided in the prism 5, which lies between the LCD 4 and the concave mirror 3, such that the half-mirror 2 extends obliquely to the optical axis. Thus, an electronic image that is rectilinearly propagated from the LCD 4 and reflected from the concave mirror 3 is reflected by the half-mirror 2 to the eyeball 1. In addition, a liquid crystal shutter 7 is provided forwardly of the prism 5 as viewed in the visual axis direction. Thus, an outside world image can be observed by opening the liquid crystal shutter 7.

According to the present invention, a polarizing plate 8 is disposed between the eyeball 1 and the prism 5. In this embodiment, the LCD 4 may have a structure in which a liquid crystal layer 41 is sandwiched between a pair of crossed polarizing plates 42 and 43, as in the case of a TN (twisted nematic) liquid crystal display device. Similarly, the liquid crystal shutter 7 may have a structure in which a liquid crystal layer 71 is sandwiched between a pair of parallel polarizing plates 72 and 73. In such a case, the LCD 4, the liquid crystal shutter 7 and the polarizing plate 8 are disposed so that the polarized light transmitting direction of the exit-side polarizing plate 43 of the LCD 4 and that of the exit-side polarizing plate 73 of the liquid crystal shutter 7 are the same as the polarized light transmitting direction of the polarizing plate 8. In the arrangement shown in FIG. 1, the polarized light transmitting direction is assumed to be the direction of p-polarization (polarization in the plane of the figure).

By providing the polarizing plate 8 in the above-described positional relationship with the LCD 4 and the liquid crystal shutter 7, the following advantageous effects are produced: Display light of an electronic image emanating from the LCD 4 and outside world light coming in through the liquid crystal shutter 7 are p-polarized light and therefore pass through the polarizing plate 8 and reach the eyeball 1 without any loss. Meanwhile, light that undesirably comes in through the gap between the observer's face and the optical unit of the head-mounted display apparatus is generally natural light and hence unpolarized. Therefore, when the unwanted light passes through the polarizing plate 8 after being reflected from the eyeball 1 or the mirror 3, the light intensity reduces to ½. Although the light is successively reflected by the concave mirror 3 and the half-mirror 2 to reach the eyeball 1, the intensity ratio of the ghost image to the normal electronic image becomes ½. Thus, an electronic image of improved contrast can be observed.

Although in this embodiment the liquid crystal shutter 7 is employed to enable an outside world image to be selectively seen through the optical system, the viewing mode switching device is not necessarily limited to the liquid crystal shutter 7. For example, a mechanical shutter or the like may also be used. Even in the case of an arrangement having no see-through function, the arrangement of this embodiment is meritorious in terms of the relationship between the electronic image and the ghost image.

It should be noted that the prism 5 is preferably made of a glass material because a glass prism can maintain the desired polarization condition even more effectively than a plastic prism.

[Second embodiment]

Figure 2:
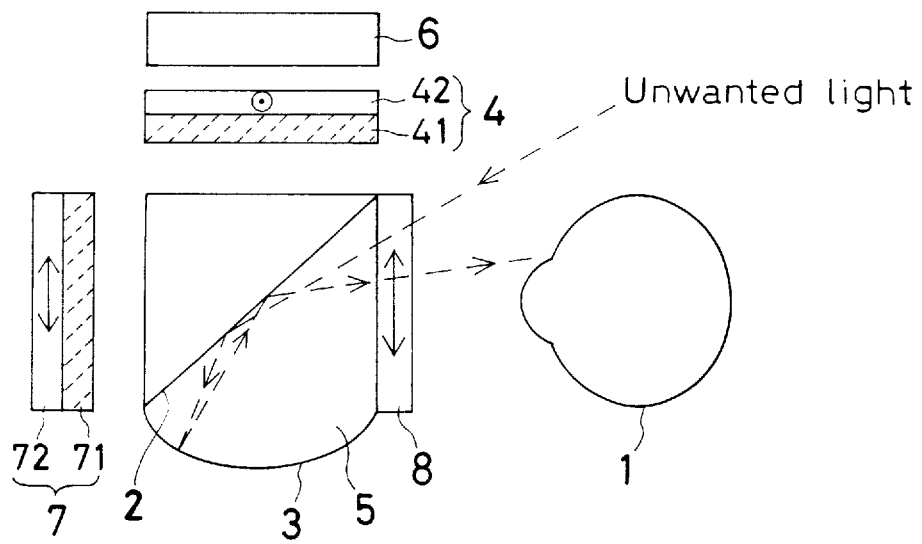
FIG. 2 is a sectional view showing the optical arrangement of a head-mounted display apparatus according to a second embodiment of the present invention.

In this embodiment, as shown in FIG. 2, the exit-side polarizing plate 43 of the LCD 4 and the exit-side polarizing plate 73 of the liquid crystal shutter 7 in the first embodiment are omitted. Instead, a polarizing plate 8 which is cemented to the observer-side end surface of the prism 5 serves as both the exit-side polarizing plate 43 of the LCD 4 and the exit-side polarizing plate 73 of the liquid crystal shutter 7. This is equivalent to an arrangement in which the exit-side polarizing plates of an ordinary LCD and liquid crystal shutter are disposed some distance away from their associated members. Light from the back light 6 is subjected to spatial modulation of the polarization condition by the liquid crystal layer 41. Thereafter, the light is successively reflected by the concave mirror 3 and the half-mirror 2 and passes through the polarizing plate 8. At this time, a display image is formed. The same is the case with the liquid crystal shutter 7.

Accordingly, light from the LCD 4, which has been modulated by an electronic image, and outside world light modulated by the liquid crystal shutter 7 pass through the polarizing plate 8 in the form of p-polarized light, and thus it reaches the eyeball 1 without any loss. Meanwhile light that undesirably comes in through the gap between the observer's face and the optical unit of the head-mounted display apparatus is generally natural light and hence unpolarized. Therefore, when the unwanted light passes through the polarizing plate 8 after being reflected from the eyeball 1 or the mirror 3, the light intensity reduces to ½. Although the light is successively reflected by the concave mirror 3 and the half-mirror 2 to reach the eyeball 1, the intensity ratio of the ghost image to the normal electronic image becomes ½. Thus, an electronic image of improved contrast can be observed. In this embodiment, since two polarizing plates can be omitted, the cost and weight of the apparatus correspondingly reduce.

Although in this embodiment also the liquid crystal shutter 7 is employed to enable an outside world image to be selectively seen through the optical system, the viewing mode switching device is not necessarily limited to the liquid crystal shutter 7. For example, a mechanical shutter or the like may also be used. Even in the case of an arrangement having no see-through function, the arrangement of this embodiment is meritorious in terms of the relationship between the electronic image and the ghost image.

It should be noted that the prism 5 is preferably made of a glass material because a glass prism can maintain the desired polarization condition even more effectively than a plastic prism.

[Third embodiment]

Figure 3:
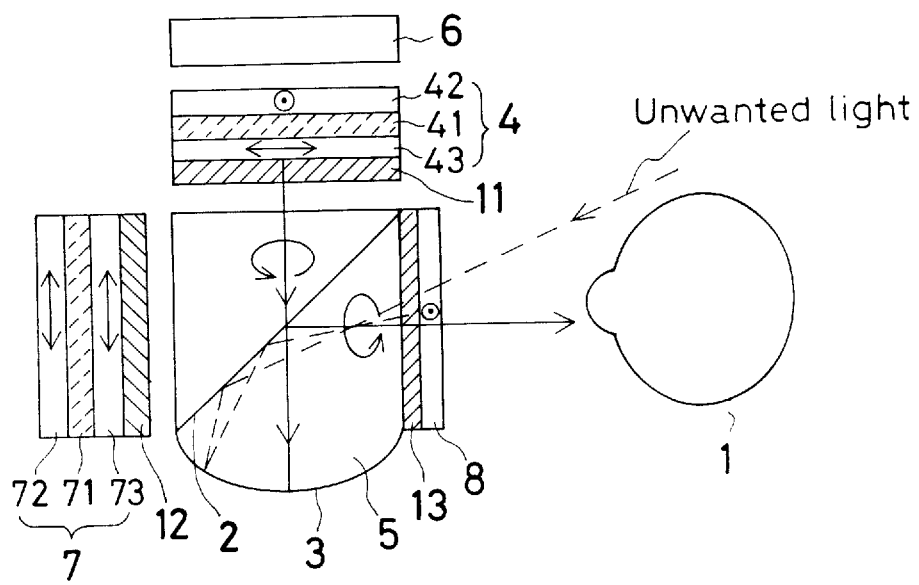
FIG. 3 is a sectional view showing the optical arrangement of a head-mounted display apparatus according to a third embodiment of the present invention.

In this embodiment, as shown in FIG. 3, quarter-wave plates 11, 12 and 13 are inserted in the arrangement of the first embodiment such that the quarter-wave plate 11 is placed at the exit side of the LCD 4, the quarter-wave plate 12 at the exit side of the liquid crystal shutter 7, and the quarter-wave plate 13 at the entrance side of the polarizing plate 8, thereby completely eliminating ghost images. The quarter-wave plates 11, 12 and 13 are disposed so that their respective crystallographic axis directions are at 45 degrees to the polarized light transmitting directions of the polarizing plates 43, 73 and 8. It should be noted that in this embodiment the polarized light transmitting direction of the polarizing plate 8 is assumed to be the direction of s-polarization (polarization perpendicular to the plane of the figure).

In the above-described arrangement, unwanted light, which is unpolarized light, becomes s-polarized light by passing through the polarizing plate 8 and then becomes left-hand circularly polarized light by passing through the quarter-wave plate 13. The light is successively reflected by the concave mirror 3 and the half-mirror 2 and repasses through the quarter-wave plate 13 to become p-polarized light. However, the p-polarized light is absorbed by the polarizing plate 8. Therefore, no unwanted light reaches the eyeball 1.

Meanwhile, light emanating from the LCD 4 and light passing through the liquid crystal shutter 7 are p-polarized light. The light becomes right-hand circularly polarized light by passing through the respective quarter-wave plates 11 and 12, and then becomes s-polarized light by passing through the quarter-wave plate 13. The s-polarized light passes through the polarizing plate 8 and reaches the eyeball 1. Accordingly, an electronic image and an outside world image are not affected by any of the quarter-wave plates 11, 12 and 13, while ghost images can be cut off.

Although in this embodiment the liquid crystal shutter 7 is employed to enable an outside world image to be selectively seen through the optical system, the viewing mode switching device is not necessarily limited to the liquid crystal shutter 7. For example, a mechanical shutter or the like may also be used. Even in the case of an arrangement having no see-through function, the arrangement of this embodiment is meritorious in terms of the relationship between the electronic image and the ghost image.

It should be noted that the prism 5 is preferably made of a glass material because a glass prism can maintain the desired polarization condition even more effectively than a plastic prism.

[Fourth embodiment]

Figure 4:
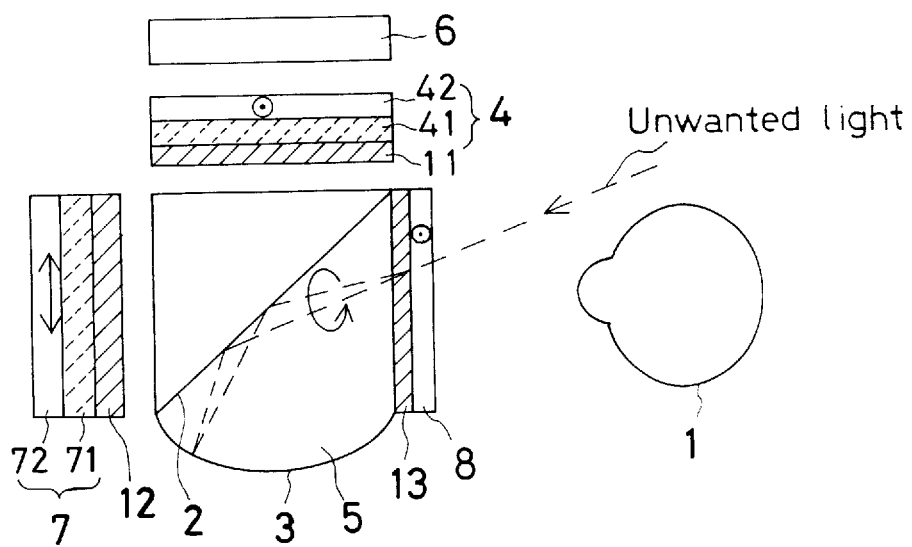
FIG. 4 is a sectional view showing the optical arrangement of a head-mounted display apparatus according to a fourth embodiment of the present invention.

In this embodiment, as shown in FIG. 4, the exit-side polarizing plate 43 of the LCD 4 and the exit-side polarizing plate 73 of the liquid crystal shutter 7 in the third embodiment are omitted. Instead, a combination of a quarter-wave plate 13 and a polarizing plate 8 serves as both the exit-side polarizing plates of the LCD 4 and the liquid crystal shutter 7. Polarized light produced by the liquid crystal layers 41 and 71 of the LCD 4 and the liquid crystal shutter 7 becomes inversely polarized light by passing through the respective quarter-wave plates 11 and 12 and through the quarter-wave plate 13. Thereafter, the light passes through the polarizing plate 8, and thus the electronic image and the outside world light reach the eyeball 1. Meanwhile, unwanted light is subjected to the same action as in the third embodiment. Accordingly, ghost images can be cut off. Moreover, since two polarizing plates are omitted, the cost and weight of the apparatus correspondingly reduce, advantageously.

[Fifth embodiment]

FIG. 5(a) is a sectional view of the optical system of a head-mounted display apparatus in this embodiment, and FIG. 5(b) is a perspective view of the head-mounted display apparatus as arranged in the form of a goggle type head-mounted display apparatus. In this embodiment, visors 14 and 15 which are formed from polarizing plates are provided on the inner edge of an optical unit 10 constituting the head-mounted display apparatus. In addition, a polarizing plate 8 is cemented to the observer-side end surface of a prism 5. The polarizing plate 8 has a polarized light transmitting direction perpendicularly intersecting the polarized light transmitting direction of the visors 14 and 15.

Referring to FIG. 5(a), the optical system in this embodiment has the same arrangement as that in the first embodiment. Unwanted light passing through the polarizing visor 14 or 15 becomes s-polarized light, and the light travels toward the end surface of the prism 5. However, since the polarized light transmitting direction of the polarizing plate 8 is the direction of p-polarization, the unwanted light is absorbed by the polarizing plate 8. Accordingly, no ghost image is produced. When the observer takes the eyeball 1 off the optical system and turns it upwardly or downwardly (shown by the dashed line), the observer can see the outside world through the visors 14 and 15, although the quantity of light reduces to ½.

It should be noted that reference numeral 16 in FIG. 5(*b*) denotes a headband for fixing the optical unit 10 to the observer's head.

[Sixth embodiment]

Figure 6:
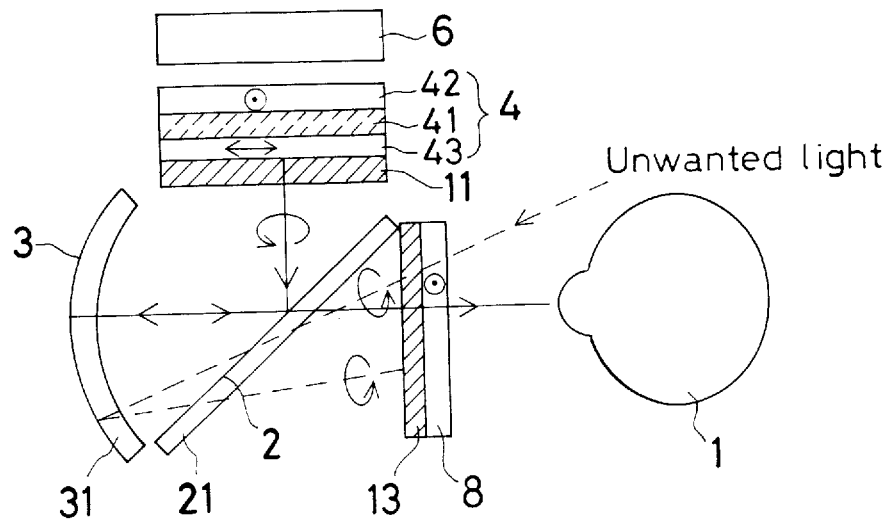
FIG. 6 is a sectional view showing the optical arrangement of a head-mounted display apparatus according to a sixth embodiment of the present invention.

In this embodiment, as shown in the sectional view of FIG. 6, the prism optical system in the third embodiment is replaced by a combination of a half-mirror plate 21 and a back-coated mirror 31 having a concave reflecting surface 3.

Figure 10:
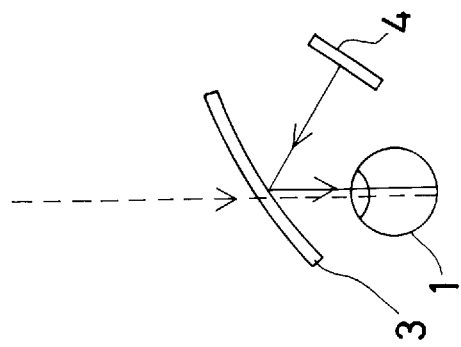
FIGS. 10(a), 10(b) and 10(c) are sectional views showing examples of optical arrangements of head-mounted display apparatuses.
Figure 10:
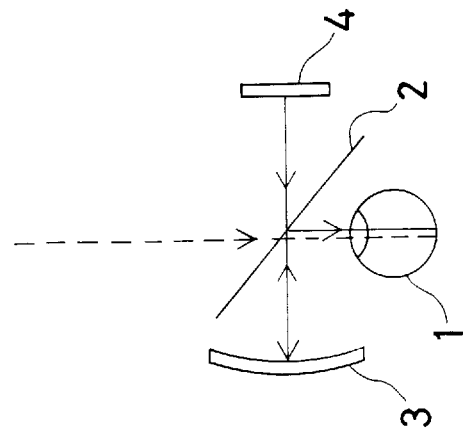
Figure 10:
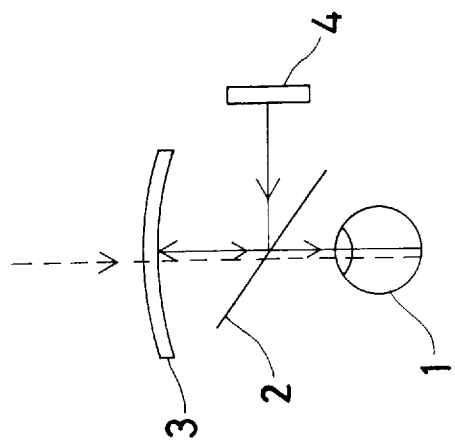
Figure 11:
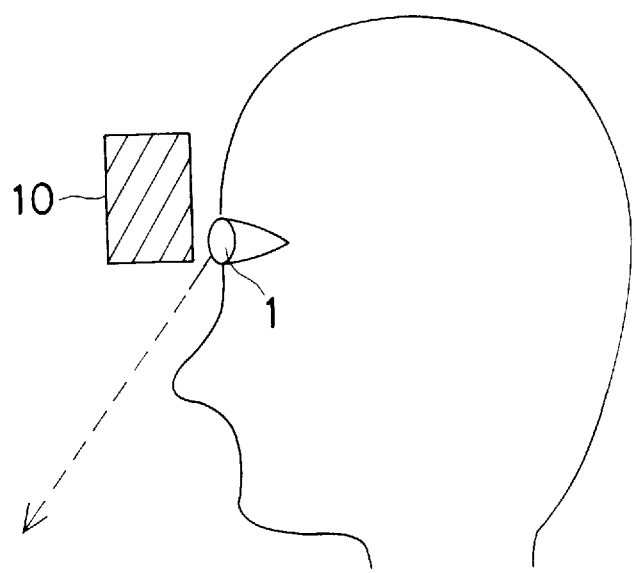
FIG. 11 is a sectional view showing the way in which an observer sees the outside world through the gap between his/her eye and an optical unit of a head-mounted display apparatus.
Figure 12:
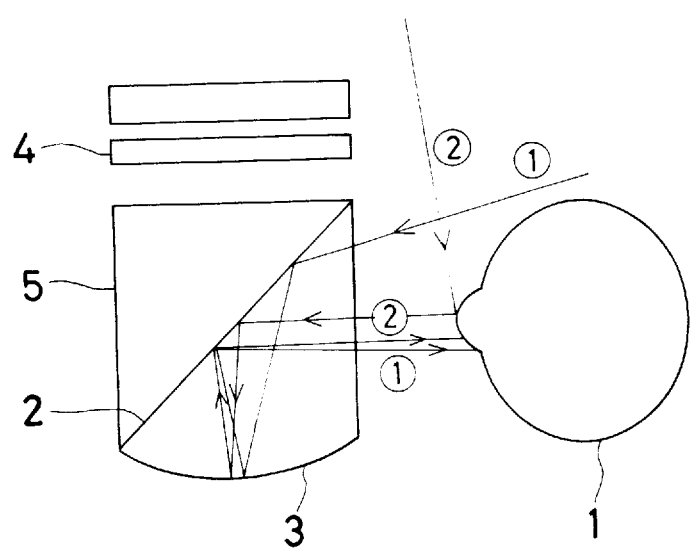
FIG. 12 is a sectional view showing the way in which flare and ghost images are caused by light that undesirably comes in through the gap between an optical unit of a head-mounted display apparatus and an observer's eye.

The back-coated mirror 31 is placed to face opposite to the eyeball 1 (see FIG. 10(*a*)). Thus, light from the LCD 4 is successively reflected by the half-mirror surface 2 and the back-coated mirror 31 and then passes through the half-mirror surface 2 to reach the eyeball 1.

The action of cutting off unwanted light is the same as in the third embodiment. That is, unwanted light becomes left-hand circularly polarized light by passing through the polarizing plate 8 and the quarter-wave plate 13, and the light is reflected by the back-coated mirror 31 and repasses through the quarter-wave plate 13 to become p-polarized light. Therefore, the unwanted light is absorbed by the polarizing plate 8.

[Seventh embodiment]

Figure 7:
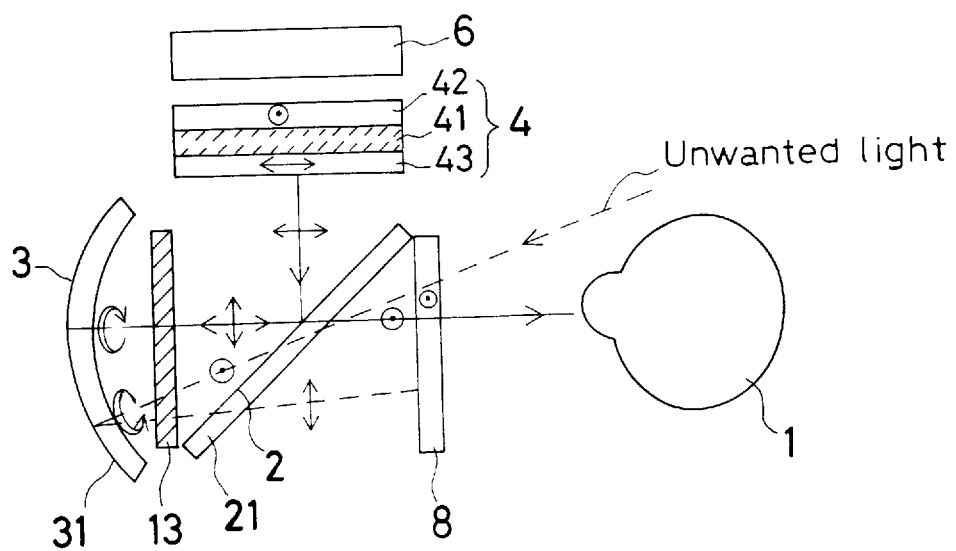
FIG. 7 is a sectional view showing the optical arrangement of a head-mounted display apparatus according to a seventh embodiment of the present invention.

In this embodiment, as shown in the sectional view of FIG. 7, the quarter-wave plate 13 in the sixth embodiment is disposed between the back-coated mirror 31 and the half-mirror plate 21. The quarter-wave plate 11, which is disposed in front of the LCD 4 in the sixth embodiment, is not used in this embodiment.

Light from the LCD 4 is p-polarized light. The light is reflected by the half-mirror 2 and then passes twice through the quarter-wave plate 13 to become s-polarized light. The light passes through the polarizing plate 8 and reaches the eyeball 1. Meanwhile, unwanted light becomes s-polarized light by passing through the polarizing plate 8, and then becomes p-polarized light by passing through the quarter-wave plate 13 twice. Therefore, the light is absorbed by the polarizing plate 8.

In this embodiment, the number of quarter-wave plates used is smaller than that in the sixth embodiment by one. Therefore, the head-mounted display apparatus reduces in both cost and weight, advantageously.

[Eighth embodiment]

Figure 8:
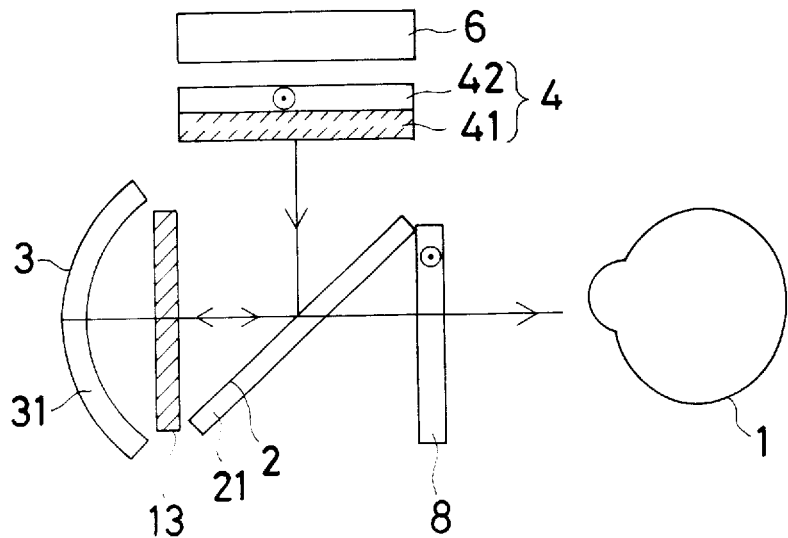
FIG. 8 is a sectional view showing the optical arrangement of a head-mounted display apparatus according to an eighth embodiment of the present invention.

In this embodiment, as shown in the sectional view of FIG. 8, the exit-side polarizing plate 43 of the LCD 4 in the seventh embodiment is omitted. The reason for this is that the polarizing plate 8, which is disposed between the half-mirror 2 and the eyeball 1, can cut off unwanted light and also serve as an exit-side polarizing plate of the LCD 4. The unwanted light eliminating action is the same as that in the sixth embodiment.

In this embodiment, the number of polarizing plates reduces by one; therefore, the cost and weight of the head-mounted display apparatus reduce, advantageously.

[Ninth embodiment]

Figure 9:
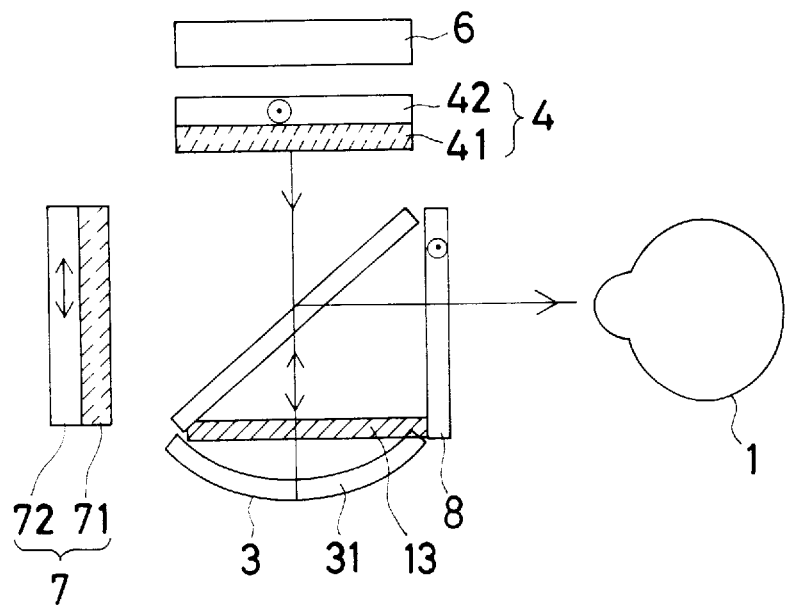
FIG. 9 is a sectional view showing the optical arrangement of a head-mounted display apparatus according to a ninth embodiment of the present invention.

In this embodiment, as shown in the sectional view of FIG. 9, the back-coated mirror 31 in the eighth embodiment is disposed to face opposite to the LCD 4 (see FIG. 10(*b*)). In addition, a liquid crystal shutter 7 for enabling an outside world image to be selectively viewed is provided. However, the liquid crystal shutter 7 has the exit-side polarizing plate omitted therefrom. The reason for this is that the polarizing plate 8, which is disposed between the half-mirror 2 and the eyeball 1, can serve as three members: a member for cutting off unwanted light: an exit-side polarizing plate of the LCD 4: and an exit-side polarizing plate of the liquid crystal shutter 7.

In this embodiment, the number of polarizing plates required in a see-through type display apparatus reduces by two. Accordingly, the cost and weight of the apparatus reduce, advantageously.

Although the optical apparatus having an ocular optical system according to the present invention has been described above by way of some embodiments, it should be noted that the present invention is not necessarily limited to these embodiments, and that various changes and modifications may be imparted thereto. Further, in application of the present invention to a head-mounted display apparatus, the present invention is applicable not only to the optical arrangements shown in FIGS. 10(*a*), 10(*b*) and 10(*c*) but also to other known optical arrangements.

As will be clear from the foregoing description, the optical apparatus according to the present invention has an arrangement including an ocular optical system for leading an image to an observer's eyeball, and a reflecting mirror for reflecting the image, in which a polarizing plate is disposed between the reflecting mirror and the observer's eyeball. Accordingly, a polarized light image passes through the polarizing plate as it is, while unwanted light, which is natural unpolarized light, is absorbed by the polarizing plate. Thus, unwanted light enters the observer's eyeball by reflection from the reflecting mirror after the quantity of light has been satisfactorily reduced. Accordingly, the ghost image reduces in light quantity relative to the normal image, and hence becomes inconspicuous, thus making it possible to provide a favorable image for observation.

What we claim is:

1. An image display apparatus comprising:

an ocular optical system for leading an image to an observer's eyeball; and a reflecting mirror for reflecting said image, said ocular optical system and reflecting mirror being contained in an optical unit, said image display apparatus further comprising:

a visor formed from a polarizing plate provided on an observer's side of said optical unit; and a polarizing plate provided between said reflecting mirror and said observer's eyeball, said polarizing plate having a polarized light transmitting direction perpendicularly intersecting a polarized light transmitting direction of said visor.

2. An image display apparatus comprising:

an image display means for forming a polarized light image; and an ocular optical system for leading said polarized light image to an observer's eyeball, wherein said image display means has an illuminating device and a display device, said display device being disposed to face opposite and adjacent to said illuminating device, wherein said ocular optical system has a reflecting mirror for reflecting said image, wherein a polarizing plate is nonrotatably secured between said ocular optical system and said observer's eyeball so as to reduce an intensity of leakage light entering said ocular optical system through a gap at a periphery of said observer's eyeball and is led to said observer's eyeball through said ocular optical system in order to prevent occurrence of flare or a ghost image which would otherwise be caused by said leakage light, and wherein said image display means and said ocular optical system are provided in combination for one eyeball.

3. An image display apparatus comprising:

an image display means for forming a polarized light image; and an ocular optical system for leading said polarized light image to an observer's eyeball, wherein said ocular optical system has a reflecting mirror for reflecting said image, and further has at least the following:

a polarizing plate disposed between said ocular optical system and said observer's eyeball;

a polarizing plate disposed to face opposite to said observer's eyeball across said ocular optical system; and a polarizing plate disposed in said image display means.

4. An image display apparatus according to claim 1, 2 or 3, further comprising means for supporting a display device for displaying an image, said ocular optical system and said reflecting mirror on an observer's head.

5. An image display apparatus according to claim 2 or 3, wherein said ocular optical system has a half-mirror disposed between said image display means and said reflecting mirror to transmit and reflect or to reflect and transmit light from said reflecting mirror toward said observer's eyeball so that light from said image display means is successively transmitted or reflected by said half-mirror, reflected by said reflecting mirror, reflected or transmitted by said half-mirror and passes through said polarizing plate disposed between said ocular optical system and said observer's eyeball to reach said observer's eyeball.

6. An image display apparatus according to claim 5, further comprising:

a first quarter-wave plate disposed in an optical path extending from said display device to said half-mirror so that a crystallographic axis direction of said first quarter-wave plate is at 45 degrees to a polarized light transmitting direction of said polarizing plate disposed between the ocular optical system and the observer's eyeball; and a second quarter-wave plate disposed in an optical path extending from said half-mirror to said polarizing plate so that a second crystallographic axis direction of said second quarter-wave plate is at 45 degrees to the polarized light transmitting direction of said polarizing plate disposed between the ocular optical system and the observer's eyeball.

7. An image display apparatus according to claim 5, further comprising a quarter-wave plate disposed in an optical path extending from said half-mirror to said reflecting mirror so that a crystallographic axis direction of said quarter-wave plate is at 45 degrees to a polarized light transmitting direction of said polarizing plate disposed between the ocular optical system and the observer's eyeball.

8. An image display apparatus according to claim 5, wherein said polarizing plate is disposed so that a polarized light transmitting direction of said polarizing plate coincides with a direction of polarization of light from said display device disposed between the ocular optical system and the observer's eyeball.

9. An image display apparatus according to claim 5, wherein said image display means is a liquid crystal display device including an illuminating device, a liquid crystal, and a polarizing plate for said liquid crystal display device provided only on a side of said liquid crystal display device which is closer to said illuminating device, said polarizing plate disposed between the ocular optical system and the observer's eyeball being disposed so that a polarized light transmitting direction of said polarizing plate disposed between the ocular optical system and the observer's eyeball coincides with or perpendicularly intersects a polarized light transmitting direction of said polarizing plate for said liquid crystal display device.

10. An image display apparatus according to claim 5, wherein said ocular optical display system comprises a glass prism having said half-mirror and said reflecting mirror integrally formed therein.

11. An image display apparatus according to claim 10, wherein said half-mirror is a mirror which splits light into transmitted light and reflected light independently of polarization.

12. An image display apparatus according to claim 5, wherein said half-mirror is a half-mirror plate.

* * * * *